(12) United States Patent
Park et al.

(10) Patent No.: US 12,222,602 B2
(45) Date of Patent: Feb. 11, 2025

(54) OPTICAL FILM AND BACKLIGHT UNIT INCLUDING THE SAME

(71) Applicant: LMS Co., Ltd., Pyeongtaek-si (KR)

(72) Inventors: Hyeonuk Park, Pyeongtaek-si (KR);
Byeonghun Lee, Pyeongtaek-si (KR);
DongKyu Lee, Pyeongtaek-si (KR)

(73) Assignee: LMS Co., Ltd., Pyeongtaek-si (KR)

( * ) Notice: Subject to any disclaimer, the term of this patent is extended or adjusted under 35 U.S.C. 154(b) by 0 days.

(21) Appl. No.: 18/624,064

(22) Filed: Apr. 1, 2024

(65) Prior Publication Data
US 2024/0329460 A1   Oct. 3, 2024

(30) Foreign Application Priority Data
Apr. 3, 2023   (KR) ................. 10-2023-0043507

(51) Int. Cl.
*G02F 1/1335* (2006.01)
*G02F 1/13357* (2006.01)

(52) U.S. Cl.
CPC .. *G02F 1/133607* (2021.01); *G02F 1/133617* (2013.01)

(58) Field of Classification Search
CPC .................................................. G02B 6/0053
See application file for complete search history.

(56) References Cited

U.S. PATENT DOCUMENTS

| | | | | |
|---|---|---|---|---|
| 11,513,392 B1* | 11/2022 | Luo | .................. | G02F 1/133606 |
| 2011/0102710 A1* | 5/2011 | Ye | .................. | G02B 6/0053 |
| | | | | 349/65 |
| 2013/0308337 A1* | 11/2013 | Chang | .................. | G02B 5/0231 |
| | | | | 362/606 |
| 2021/0088712 A1* | 3/2021 | Cheng | .................. | G02B 6/0068 |
| 2022/0057547 A1* | 2/2022 | Kim | .................. | G02B 5/206 |
| 2022/0146882 A1* | 5/2022 | Kim | .................. | G02B 6/0053 |
| 2023/0229040 A1* | 7/2023 | Park | .................. | G02B 6/0081 |
| | | | | 362/97.1 |
| 2024/0027830 A1* | 1/2024 | Lee | .................. | G02F 1/133614 |

FOREIGN PATENT DOCUMENTS

| KR | 20160118711 A | 10/2016 |
|---|---|---|
| KR | 20230024718 A | 2/2023 |

OTHER PUBLICATIONS

Korean Intellectual Property Office, Request for the Submission of an Opinion for KR Application No. 10-2023-0043507, Aug. 28, 2024.

* cited by examiner

*Primary Examiner* — Eric T Eide
(74) *Attorney, Agent, or Firm* — NKL LAW; Jae Youn Kim

(57) ABSTRACT

An optical film according to various embodiments of the present invention may include a first sheet comprising a first base portion, a first pattern layer including a plurality of prisms and formed on a surface of the first base portion, and a second pattern layer including a plurality of pyramids and formed as intaglio on the other surface of the first base portion; and a second sheet including a second base portion; a third pattern layer including a plurality of protrusions with an adhesive property and formed as a matte pattern on a surface of the second base portion, and a fourth pattern layer including a plurality of pyramids and formed as intaglio on the other surface of the second base portion.

20 Claims, 13 Drawing Sheets

| Prism Vertex Angle | 70° | 80° | 90° |
|---|---|---|---|
| Brightness (LED 1EA) |  |  |  |
| Brightness (LED 9EA) |  |  |  |
| Beam Width (mm) | 2.77 | 3.85 | 3.92 |
| Brightness (nit) | 30773.0 | 21179.7 | 8219.3 |
| Prism Vertex Angle | 100° | 110° | 120° |
| Brightness (LED 1EA) |  |  |  |
| Brightness (LED 9EA) |  |  |  |
| Beam Width (mm) | 2.83 | 2.41 | 2.71 |
| Brightness (nit) | 9397.3 | 20204.3 | 20204.3 |

| Prism Pitch Distance | 10μm | 30μm | 50μm |
|---|---|---|---|
| Brightness (LED 1EA) |  |  |  |
| Brightness (LED 9EA) |  |  |  |
| Beam Width (mm) | 4.19 | 4.14 | 3.92 |
| Brightness (nit) | 10772.7 | 11353.6 | 8219.3 |
| Prism Pitch Distance | 70μm | 90μm | - |
| Brightness (LED 1EA) |  |  | - |
| Brightness (LED 9EA) |  |  | - |
| Beam Width (mm) | 4.18 | 3.96 | - |
| Brightness (nit) | 10078.7 | 10565.2 | - |

| Pyramid Vertex Angle | 90° | 100° | 110° | - |
|---|---|---|---|---|
| Brightness (LED 1EA) |  |  |  | - |
| Brightness (LED 9EA) |  |  |  | - |
| Beam Width (mm) | 3.00 | 3.17 | 3.48 | - |
| Brightness (nit) | 43472.7 | 24430.2 | 18246.4 | - |
| Pyramid Vertex Angle | 120° | 130° | 140° | 150° |
| Brightness (LED 1EA) |  |  |  |  |
| Brightness (LED 9EA) |  |  |  |  |
| Beam Width (mm) | 4.25 | 4.33 | 4.50 | 3.75 |
| Brightness (nit) | 13252.0 | 8852.5 | 8093.3 | 7858.4 |

| Pyramid Pitch Distance | 40 μm | 60 μm |
|---|---|---|
| Brightness (LED 1EA) | | |
| Brightness (LED 9EA) | | |
| Beam Width (mm) | 3.77 | 3.60 |
| Brightness (nit) | 10282.0 | 10627.2 |
| Prism Pitch Distance | 80 μm | 100 μm |
| Brightness (LED 1EA) | | |
| Brightness (LED 9EA) | | |
| Beam Width (mm) | 3.49 | 3.23 |
| Brightness (nit) | 13909.8 | 14405.2 |

FIG. 9A

OPTICAL FILM AND BACKLIGHT UNIT INCLUDING THE SAME

CROSS-REFERENCE TO RELATED APPLICATION(S)

This application is based on and claims priority under 35 U.S.C. 119 to Korean Patent Application No. 10-2023-0043507, filed on Apr. 3, 2023, in the Korean Intellectual Property Office, the disclosure of which is herein incorporated by reference in its entirety.

TECHNICAL FIELD

Various embodiments of the present specification relate to an optical film and a backlight unit including the optical film.

BACKGROUND

In general, a liquid crystal display (LCD) device may include a backlight unit that uniformly irradiates light across the entire screen of an electronic device. Depending on the location of a light source, the backlight unit can be called as either an edge-type backlight unit where a lamp is located on the side of a substrate containing a display surface and a light guide plate is required to change light from the lamp to surface light or a direct-type backlight unit where a lamp is located below a substrate containing a display surface and a light guide plate is not required due to its location. Among them, the direct-type backlight unit is widely used for the liquid crystal display (LCD) because it has high light utilization efficiency, is simple in configuration, and has no limitations on the size of the substrate. A typical direct-backlight unit may include a light source, a diffusion sheet, and an optical film including a prism. Light emitted from the light source may be diffused through the diffusion sheet and then transmitted to the liquid crystal panel (LCD) through the optical film provided on the top.

As a light source, mini LEDs (light emitting diodes) and/or micro LEDs, which have advantages such as miniaturization, weight reduction, and/or low power consumption, are actively used for a liquid crystal display (LCD) device. It is possible to implement clearer image quality through using mini LEDs or micro LEDs as the light source over using a conventional light source because each chip can constitute an individual pixel or light source thereby eliminating restrictions on the size and the shape of the display. Along with miniaturization of LED chips, research for a backlight unit is also actively underway to complement LED light characteristics when the LED chips are utilized as the light source of the backlight unit.

Conventionally, a direct-backlight unit that uses mini LEDs or micro LEDs as a light source may include a diffusion sheet to change light from a point light source to a surface light source. As the light source is placed on a flat surface in the direct-type backlight unit, a thick diffusion sheet or a plurality of stacked diffusion sheets may be required for the direct-type backlight unit to prevent the shape of the light source (e.g., the shape of a mini LED or micro LED) from being visible on the liquid crystal panel. The diffusion sheet may additionally or alternatively include a shielding sheet for shielding a hot spot, which is a phenomenon where the shape of a light source is visible on the liquid crystal panel.

The shielding sheet (and/or diffusion sheet) must be thick enough to achieve shielding performance that prevents the shape of the light source from being visible on the liquid crystal panel. However, using the shielding sheet may limit the thickness of the liquid crystal display (LCD) device. Furthermore, if the thickness of the shielding sheet is excessively thick, a problem may occur where the brightness of the liquid crystal display (LCD) device is greatly reduced. As described above, for the backlight unit provided with the shielding sheet, the thickness of the shielding sheet may be related to its shielding performance and the brightness performance where the shielding performance and the brightness performance may be in a trade-off relationship. Therefore, it is necessary to provide an optical film for a liquid crystal display (LCD) device with improved brightness performance without using a thick diffusion sheet thereby a backlight unit for the liquid crystal display (LCD) device not being thick.

SUMMARY

It is an object to provide an optical film having excellent brightness performance according to various embodiments of the present invention.

It is another object to provide a backlight unit including an optical film having excellent brightness performance according to various embodiments of the present invention.

According to an embodiment of the invention, there is provided that an optical film comprises a first sheet including a first base portion; a first pattern layer including a plurality of first prisms where each prism has a first vertex angle and a first height, the first prisms are arranged parallel along a first direction with a first pitch distance between the first prisms and are formed on a first surface of the first base portion; and a second pattern layer including a plurality of first intaglio pyramids where each first intaglio pyramid has a second vertex angle and a second height, the first intaglio pyramids are arranged parallel along a second direction as a row direction of the first intaglio pyramids and a third direction as a column direction of the first intaglio pyramids with a second pitch distance between the first intaglio pyramids and are formed as intaglio on a second surface of the first base portion; and a second sheet including a second base portion, a third pattern layer wherein a plurality of protrusions with an adhesive property is arranged randomly and is formed as a matte pattern on a third surface of the second base portion; and a fourth pattern layer including a plurality of second intaglio pyramids arranged parallel along a fourth direction as a row direction of the second intaglio pyramids and a fifth direction as a column direction of the second intaglio pyramids and formed as intaglio on a fourth surface of the second base portion, where the first direction and the second direction form an angle in a range of 40° to 50°; the second direction and the fourth direction are substantially the same direction, the third direction and the fifth direction are substantially the same direction, and the first sheet and the second sheet are laminated through the third pattern layer.

In an embodiment, a refractive index of the first pattern layer and a refractive index of the fourth pattern are substantially the same and the refractive index of the first pattern layer and the refractive index of the fourth pattern are in a range of 1.50 to 1.70 for the optical film in the present invention.

In an embodiment, the first vertex angle is in a range of 70° to 90° for the optical film in the present invention.

In an embodiment, a ratio of the first height to the first pitch distance is in a range of approximately 1:1.4 to 1:2 upon the first vertex angle is less than 90° for the optical film in the present invention.

In an embodiment, the first height is in a range of 20 μm to 40 μm and the first pitch distance is in a range of 40 μm to 60 μm upon the first vertex angle is less than 90° for the optical film in the present invention.

In an embodiment, the second vertex angle is in a range of 90° to 150° for the optical film in the present invention.

In an embodiment, the second vertex angle is in a range of 85° to 95° upon fixing the first vertex angle of 90° for the optical film in the present invention.

In an embodiment, a ratio of the second height to the second pitch distance is approximately 1:2 upon the first vertex angle is less than 90° for the optical film in the present invention.

In an embodiment, the second height is in a range of 40 μm to 60 μm and the second pitch distance is in a range of 80 μm to 120 μm upon fixing the first vertex angle of 90° and the second vertex of 90° for the optical film in the present invention.

In an embodiment, a thickness of the second base portion is thicker than a thickness of the first base portion for the optical film in the present invention.

In an embodiment, a cross-section of the first intaglio pyramid is a trapezoidal shape for the optical film in the present invention.

According to another embodiment of the invention, there is provided that a backlight unit comprises a light source; a color conversion sheet disposed on the light source; a first optical film disposed on the color conversion sheet and comprising a third sheet including a third base portion, a fifth pattern layer further including a plurality of second prisms where each second prism has a third vertex angle and a third height, the second prisms are arranged parallel along a sixth direction with a third pitch distance between the second prisms and are formed on a fifth surface of the third base portion, and a sixth pattern layer including a plurality of third intaglio pyramids where each third intaglio pyramid has a fourth vertex angle and a fourth height, the third intaglio pyramids are arranged parallel along a seventh direction as a row direction of the third intaglio pyramids and an eighth direction as a column direction of the third intaglio pyramids with a fourth pitch distance between the third intaglio pyramids and are formed as intaglio on a sixth surface of the third base portion; and a fourth sheet including a fourth base portion; a seventh pattern layer where a plurality of protrusions with an adhesive property is arranged randomly and is formed as a matte pattern on a seventh surface of the fourth base portion, and a eighth pattern layer including a plurality of fourth intaglio pyramids arranged parallel along a ninth direction as a row direction of the fourth intaglio pyramids and a tenth direction as a column direction of the fourth intaglio pyramids and formed as intaglio on a eighth surface of the fourth base portion, where the sixth direction and the seventh direction form an angle in a range of 40° to 50°, the seventh direction and the ninth direction are substantially the same direction, the eighth direction and the tenth direction are substantially the same direction, and the third sheet and the fourth sheet are laminated through the seventh pattern layer; a second optical film disposed on the first optical film and further comprising a fifth sheet including a fifth base portion, and a ninth pattern layer including a plurality of third prisms where the third prisms are arranged parallel along an eleventh direction and are formed on a ninth surface of the fifth base portion, and a sixth sheet including a sixth base portion, and a tenth pattern layer including a plurality of fourth prisms where the fourth prisms are arranged parallel along a twelfth direction and are formed on a tenth surface of the sixth base portion, where the sixth sheet is disposed on the third sheet of the first optical film, the fifth sheet is disposed on the sixth sheet, and the eleventh direction and the twelfth direction form an angle in a range of 85° to 95°; and a diffusion sheet disposed on fifth sheet of the second optical film.

In another embodiment, a refractive index of the fifth pattern layer and a refractive index of the eighth pattern are substantially the same and the refractive index of the fifth pattern layer and the refractive index of the eighth pattern are in a range of 1.50 to 1.70 for the backlight unit in the present invention.

In another embodiment, the third vertex angle is in a range of 70° to 90° for the backlight unit in the present invention.

In another embodiment, the third height is in a range of 20 μm to 40 μm and the third pitch distance is in a range of 40 μm to 60 μm upon the third vertex angle is less than 90° for the backlight unit in the present invention.

In another embodiment, the fourth vertex angle is in a range of 85° to 95° upon fixing the third vertex angle of 90° for the backlight unit in the present invention.

In another embodiment, the fourth height is in a range of 40 μm to 60 μm and the fourth pitch distance is in a range of 80 μm to 120 μm upon fixing the third vertex angle of 90° and the fourth vertex of 90° for the backlight unit in the present invention.

In another embodiment, a thickness of the third base portion is thicker than a thickness of the fourth base portion for the backlight unit in the present invention.

In another embodiment, a cross-section of the third intaglio pyramid is a trapezoid shape for the backlight unit in the present invention.

In another embodiment, the fifth sheet and the sixth sheet are laminated for the backlight unit in the present invention.

BRIEF DESCRIPTION OF THE DRAWINGS

FIG. 9A is a table showing brightness, beam width, and brightness values with respect to the pitch distance of each pyramid according to various embodiments of the present invention.

DETAILED DESCRIPTION

Figure 1:
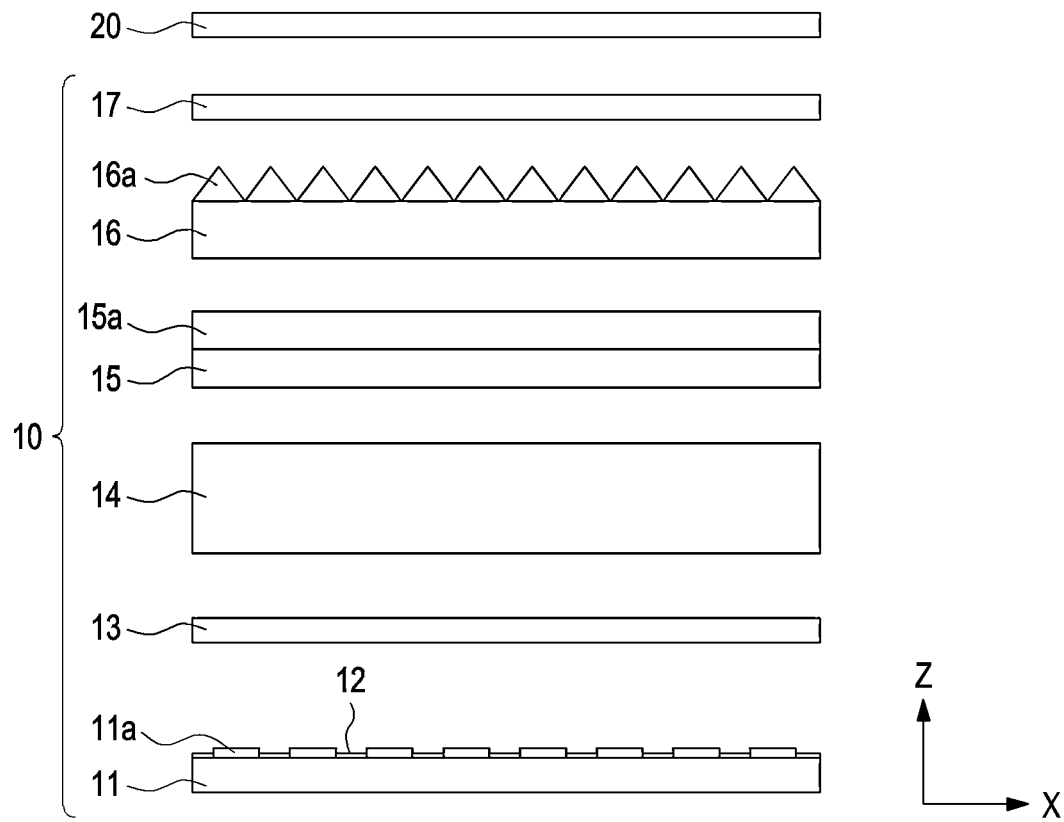
FIG. 1 is a schematic showing a conventional liquid crystal display (LCD) device including a diffusion sheet.

Various embodiments and terms used in the specification are not intended to limit the technical features described in the specification to specific embodiments, but it should be understood to include various modifications, equivalents, or substitutions of the embodiments. In connection with the description of the drawings, similar reference numerals may be used for similar or related components. The singular form of the noun corresponding to the item may include one or more of the elements unless the relevant context clearly dictates otherwise.

According to various embodiments, each component (e.g., film or sheet) of the above-described components may include a single or plural entity, and some of the plurality of entities may be separately placed in other components. According to various embodiments, one or more of the components or operations described above may be omitted, or one or more other components or operations may be added. Multiple components (e.g., films or sheets) may be alternatively or additionally integrated into a single component. In this case, the integrated component may perform one or more functions of each component of the plurality of components in the same or similar manner as those performed by the corresponding component of the plurality of components prior to the integration.

Embodiments will be described with reference to the associating drawings. In describing the present embodiment, the same names and the same reference numerals are used for the same components, and an additional description thereof will be omitted. In addition, in describing the embodiment of the present invention, the same names and reference numerals are used for components having the same functions, and it is substantially not completely the same as in the prior art.

According to various embodiments, terms such as "comprise" or "have" are intended to designate the presence of a feature, number, step, operation, component, part, or combination described in the specification. It should be understood, however, that the above does not preclude the possibility of addition or existence of one or more of other features, or numbers, steps, operations, components, parts, or combinations.

FIG. 1 is a schematic showing a conventional liquid crystal display (LCD) device including a diffusion sheet. Referring to FIG. 1, a liquid crystal display (LCD) device 1 may include a backlight unit 10 and a liquid crystal panel 20. According to various examples, the backlight unit 10 may be disposed toward the rear direction (a direction facing the −Z-direction) of the liquid crystal panel 20 to emit light to the liquid crystal panel 20. The backlight unit 10 may include a substrate 11 including a light source 11a, a color conversion sheet 13, diffusion sheets 14, 17, and prism sheets 15, 16. The backlight unit 10 may further include a reflective polarizing sheet although it not shown in FIG. 1.

According to various embodiments, the light source 11a is configured to emit light to the back of the liquid crystal panel 20 and may be disposed on one side of the substrate 11. The light source 11a may be a light emitting diode (referred to as LED). The light source 11a may include, for example, a plurality of LED chips 11a that emit light. Depending on the size of the LED chip, LEDs are classified into a large LED (chip size: 1,000 μm or more), a middle LED (chip size: 300-500 μm), and a small LED (chip size: 200 μm-300 μm), a mini LED (chip size: 100-200 μm), and a micro LED (chip size: 100 μm or less). Here, the LED may include material such as InGaN and GaN. Light emitted from the light source 11a may be emitted toward the liquid crystal panel 20 (+Z-direction). Light emitted from the light source 11a may pass through the color conversion sheet 13 and enter the diffusion sheet 14.

According to various embodiments, a reflective sheet 12 may be formed on the surface of the substrate 11. The reflective sheet 12 may include material such as $BaSO_4$, $TiO_2$, $CaCO_3$, $SiO_2$, $Ca_3(SO_4)_2$ or may include material such as Ag. It may be deposited or coated between the light sources 11a on a substrate 11. The reflective sheet 12 may serve to reflect light which was reflected toward the substrate 11 by interfacial reflection while the emitted light from the light source 11a passed through the color conversion sheet 13, diffusion sheets 14, 17, and prism sheets 15, 16 back in the direction where the light was emitted. Through this, loss of light can be minimized. In other words, the reflective sheet 12 can perform light recycling.

According to various embodiments, the color conversion sheet 13 can convert the color of light emitted from the light source 11a. For example, the light from a mini LED or a micro LED may be blue light (450 nm). In this case, the blue light needs to be converted to white light. The color conversion sheet 13 can transmit the blue light emitted from the light source 11a and simultaneously convert the blue light into the white light.

According to various embodiments, the diffusion sheets 14, 17 may uniformly disperse light incident from the color conversion sheet 13. The diffusion sheets 14, 17 which curable resin solution including light diffuser beads (e.g., at least one or more selected from urethane acrylate, epoxy acrylate, ester acrylate, ester acrylate, and radical generating monomer added as a single or a mixed) was deposited can cause light diffusion by the light diffuser beads. Additionally, the diffusion sheets 14, 17 may be formed with uniform size or non-uniform size shape (for example, spherical shape) of protrusion patterns (or protrusions) to promote the light diffusion.

According to various embodiments, the diffusion sheets 14, 17 may include a lower diffusion sheet 14 and an upper diffusion sheet 17. The lower diffusion sheet 14 may be disposed between the color conversion sheet 13 and the prism sheet 15 and the upper diffusion sheet 17 may be disposed between the prism sheet 16 and the liquid crystal panel 20. If the back light unit 10 further includes a reflective polarizing sheet, the upper diffusion sheet 17 may be disposed between the prism sheet 16 and the reflective polarizing sheet.

According to various embodiments, the prism sheets 15, 16 can condense incident light using an optical pattern formed on the surface, and then, emit it to the liquid crystal panel 20. The prism sheets 15, 16 may include a light-transmitting base film and a prism pattern layer formed on an upper surface (a surface facing the +Z-direction) of the base film. The prism pattern layer may be formed as an optical pattern layer in the form of a triangular array with an inclined surface at a specified angle (for example, an inclined surface of 45°) to improve brightness in the planar direction. The prism patterns of the prism pattern layer may be in the shape of a triangular pillar and may be arranged so that one side of the triangular pillar faces the base film.

According to one embodiment, the prism sheets 15, 16 may include a first prism sheet 15 and a second prism sheet 16 to form a composite prism sheet structure. Here, the second prism sheet 16 may be disposed to overlap the upper surface of the first prism sheet 15. In the first prism sheet 15, a plurality of first prism patterns may be arranged side by side with each other. Each first prism pattern may have a structure extending in one direction. For example, the vertex line 15a of each of the first prism patterns may be formed to extend to X-direction. Similarly, in the second prism sheet 16, a plurality of second prism patterns may also be arranged side by side with each other. Each second prism pattern may have a structure extending in another direction. For example, the vertex line 16a of each of the second prism patterns may be formed to extend in a direction perpendicular to the X-axis and Z-axis (referred to as 'Y-direction'). Here, the extension direction of the first prism patterns and the extension direction of the second prism patterns are shown as directing to the X-direction and the Y-direction for the convenience of explanation. However, it is not limited to the illustrated embodiment and may be oriented in a direction other than the X-direction or the Y-direction.

According to various embodiments, a reflective polarizing sheet (not shown) is provided on the prism sheets 15, 16 and the upper diffusion sheet 17. The reflective polarizing sheet may serve to transmit some polarized light and to reflect other polarized light downward as to the light condensed from the prism sheets 15, 16 and diffused by the upper diffusion sheet 17.

According to various embodiments, the liquid crystal panel 20 may refract light emitted from the light source 11a to a predetermined pattern according to an electrical signal. The refracted light may pass through a color filter and a polarizing filter disposed on the front of the liquid crystal panel 20 to form a screen image.

Figure 2:
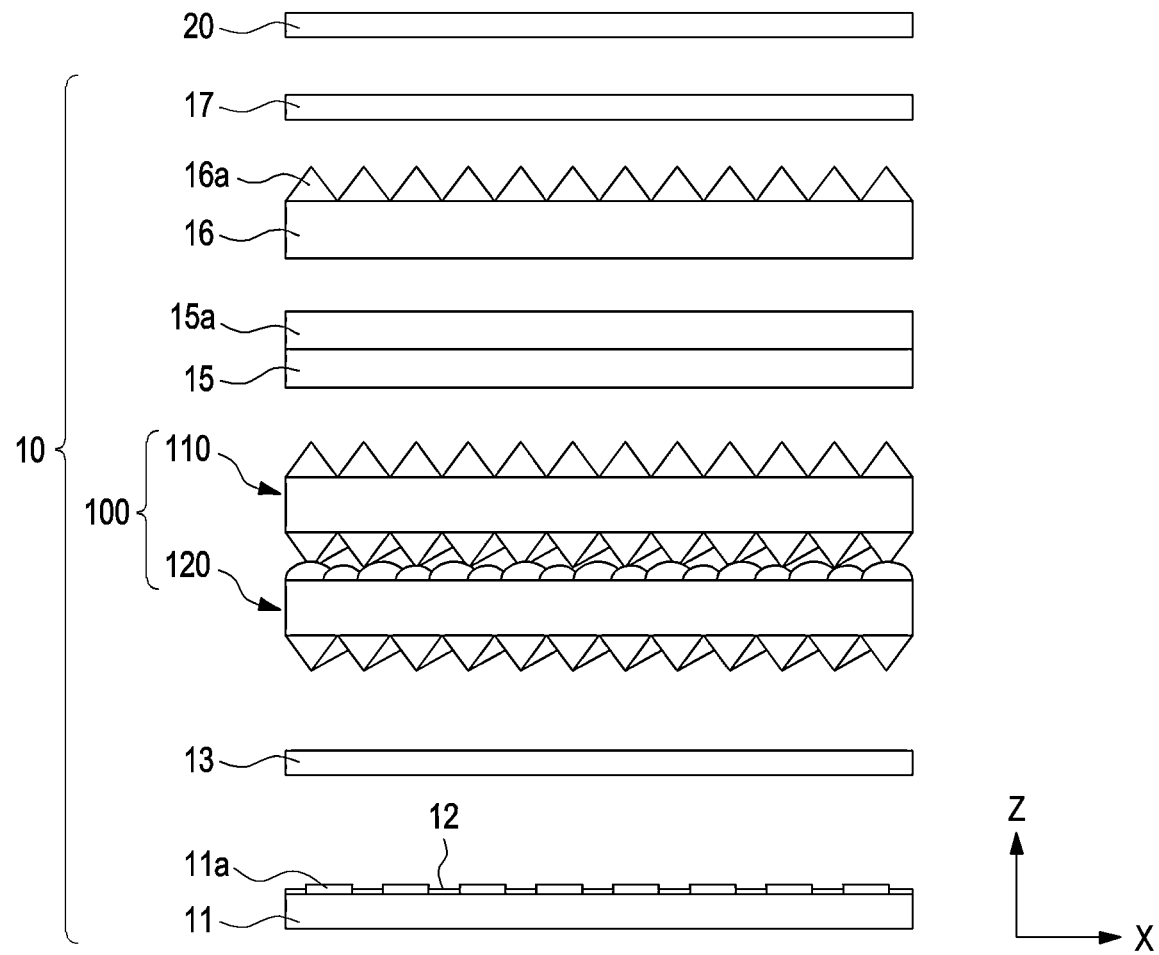
FIG. 2 is a schematic illustrating a liquid crystal display (LCD) device including a backlight unit provided with an optical film where a plurality of films is laminated according to various embodiments of the present invention.

FIG. 2 is a schematic illustrating a liquid crystal display (LCD) device including a backlight unit provided with a shielding sheet where a plurality of films is laminated according to various embodiments of the present invention. Referring to FIG. 2, a liquid crystal display (LCD) device 1 according to an embodiment of the present invention includes a backlight unit 10 and a liquid crystal panel 20. The backlight unit 10 may include a substrate 11 including a light source 11a, a color conversion sheet 13, an optical film 100, prism sheets 15, 16, and a diffusion sheet 17. According to one embodiment, a reflective sheet 12 may be formed on one side of the light source 11a.

According to one embodiment, at least one of these components (e.g., the diffusion sheet 17) may be omitted from or one or more other components (e.g., a reflective polarizing sheet (not shown)) may be added to the backlight unit 10. Here, description of parts overlapping with FIG. 1 will be omitted.

The liquid crystal display (LCD) device 1 of the present invention may be characterized by providing at least one optical film formed in a laminate structure. Here, at least one optical film 100 may replace the lower diffusion sheet 14 or may be additionally provided. Here, explanation as to the drawings of the present invention may be given for at least one optical film provided on one side as an example for replacing the lower diffusion sheet 14.

In the present specification, an 'optical film' may refer to a structure where a light-transmitting base film (referred to as 'base portion') provided with a first pattern on one side and two diffusion sheets further including a second pattern on the other side of the base portion are laminated together. Additionally, at least one optical film may include a structure where two optical films are stacked each other. However, it is not limited to this, and in some cases, it may include three or more optical films. Although the drawing of FIG. 2 is somewhat exaggerated for the convenience of explanation, it shows that two very thin sheets 110, 120 having different thicknesses are laminated to form the first optical film 100.

In the present specification, 'lamination' may mean that at least one of two different sheets is provided with an adhesive and adhered together. The laminated optical film can provide a backlight unit that is thinner and has excellent shielding performance compared to an embodiment where the optical film is simply stacked rather than laminated.

According to various embodiments of the present invention, the first optical film 100 may be configured to have the first sheet 110 and the second sheet 120 having a thickness of the base portion of approximately 100 µm to be laminated together in a case where two different diffusion sheets 110, 120 form one optical film. The first optical film 100 in the present invention may be provided on the color conversion sheet 13 for replacing or being added to the lower diffusion sheet 14.

The optical film 100 (referred to as 'laminated optical film') according to various embodiments of the present invention may be provided with high rigidity and excellent shielding performance while it is thinner by a several µm or more compared to an embodiment where two or three sheets with a thickness of approximately 100 µm or approximately 160 µm, for example, are simply stacked (referred to as 'unlaminated optical film'). For example, according to a simulation result conducted by an inventor, the laminated optical film with a thickness of approximately 327 µm may provide the brightness value corresponding to or excellent over the brightness value of the unlaminated optical film with a thickness of approximately 335 µm where the two different diffusion sheets described above are not laminated while the laminated optical film has a thinner thickness.

Figure 3:
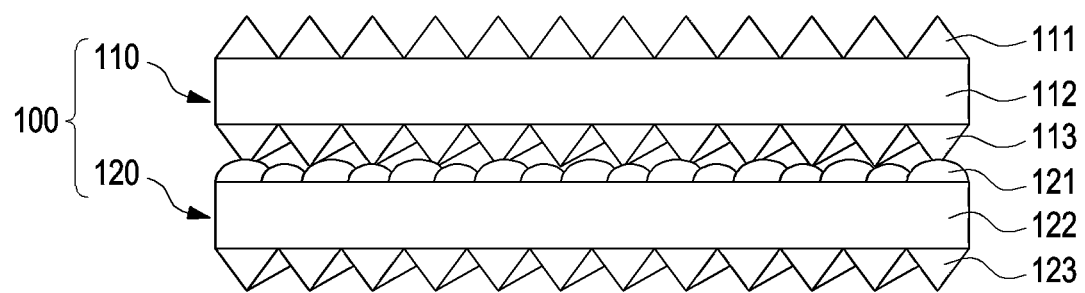
FIG. 3 is a side view showing an optical film where a plurality of sheets is laminated according to various embodiments of the present invention.
Figure 4:
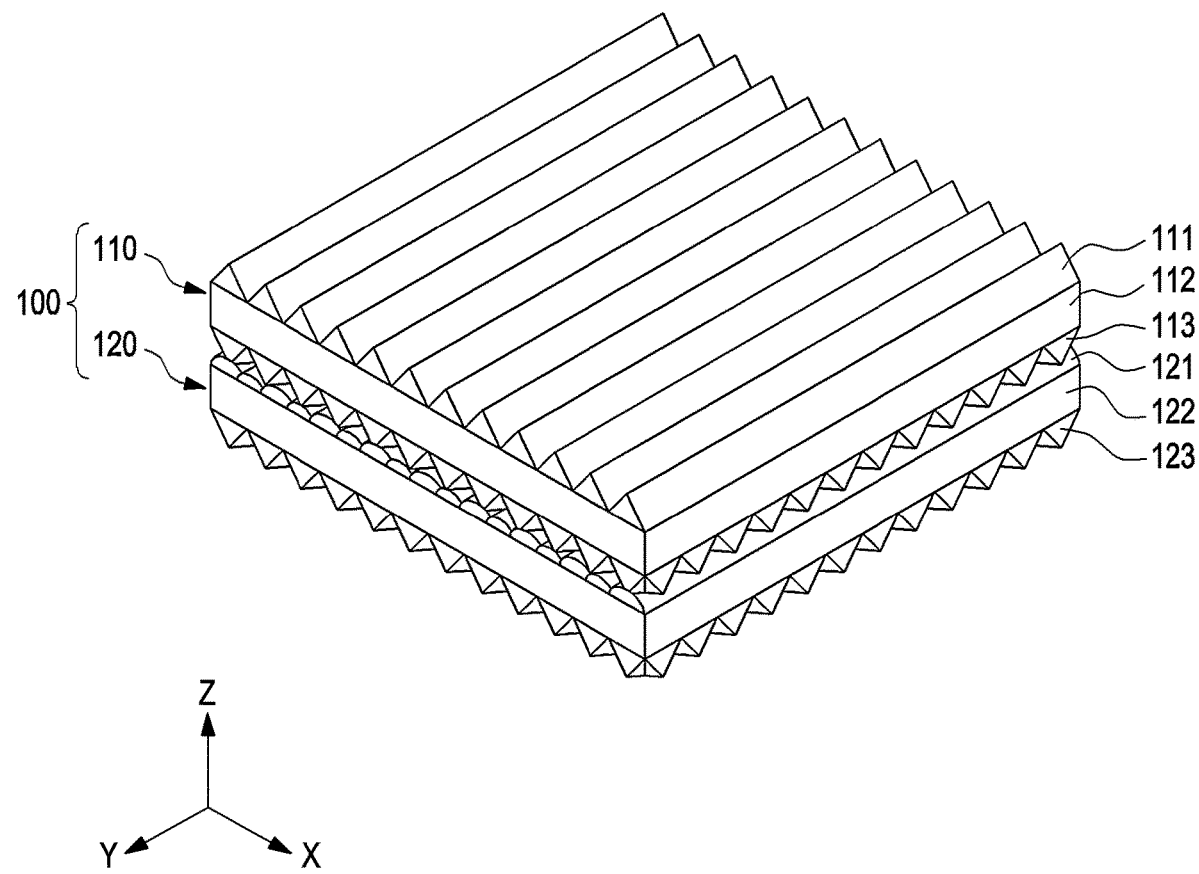
FIG. 4 is a perspective view showing an optical film where a plurality of sheets is laminated according to various embodiments of the present invention.

FIG. 3 is a side view showing an optical film where a plurality of sheets is laminated according to various embodiments of the present invention. FIG. 4 is a perspective view showing an optical film where a plurality of sheets is laminated according to various embodiments of the present invention.

In the present specification, a backlight unit (e.g., backlight unit 10 of FIGS. 1 and 2) may include a first optical film 100. The first optical film 100 may include a first sheet 110 and a second sheet 120 laminated with the first sheet 110.

According to one embodiment of the present invention, the first sheet 110 of the first optical film 100 may include a first base portion 112 and a second base portion 122. The first optical film 100 may include a first pattern layer 111 including a first pattern disposed on one surface of the first base portion 112 and a second pattern layer 113 including a second pattern different from the first pattern disposed on the other surface of the first base portion 112. The second sheet 120 of the first optical film 100 may include a third pattern layer 121 including a third pattern on one surface of the second base portion 122 and a fourth pattern layer 123 including a fourth pattern different from the third pattern disposed on the other surface of the second base portion 122.

According to one embodiment, the first base portion 112 and the second base portion 122 may have thicknesses corresponding to each other. For example, the first base portion 112 and the second base portion 122 may have a thickness of approximately 100 µm. If the base portion is thin, it may be damaged by heat generated from the light source 11a thereby causing the sheet to be unevenly swelled (sheet warping phenomenon). Therefore, according to another embodiment, the thickness of the second base portion 122 close to the light source 11a may be formed to be thicker than the thickness of the first base portion 112 to prevent the sheet from being unevenly swelled thereby improving the reliability of a product.

According to one embodiment, the brightness performance of the first optical film 100 can be improved based on the refractive index of each layer which included in the first sheet 110 and the second sheet 120 of the first optical film 100. For the first optical film 100, when the refractive index of the light input layer and the refractive index of the light output layer are formed to be equal, as the brightness performance can be improved. Thus, the refractive index of the fourth pattern layer 123 which is the light input layer may be the same as the refractive index of the first pattern layer 111 which is the light output layer. For example, the refractive index of the first pattern layer 111 and the fourth pattern layer 123 may be approximately 1.50 to 1.70, respectively. For another example, the refractive index of the first pattern layer 111 and the refractive index of the fourth pattern layer 123 may each be approximately 1.60. Additionally, the refractive index of the second pattern layer 113 may be approximately 1.50 to 1.70 and the refractive index of the third pattern layer 121 may be approximately 1.45 to 1.55. For example, the refractive index of the second pattern layer 113 may be approximately 1.60 and the third pattern layer 121 may be coated with adhesive material and may have a refractive index of approximately 1.51.

Figure 5:
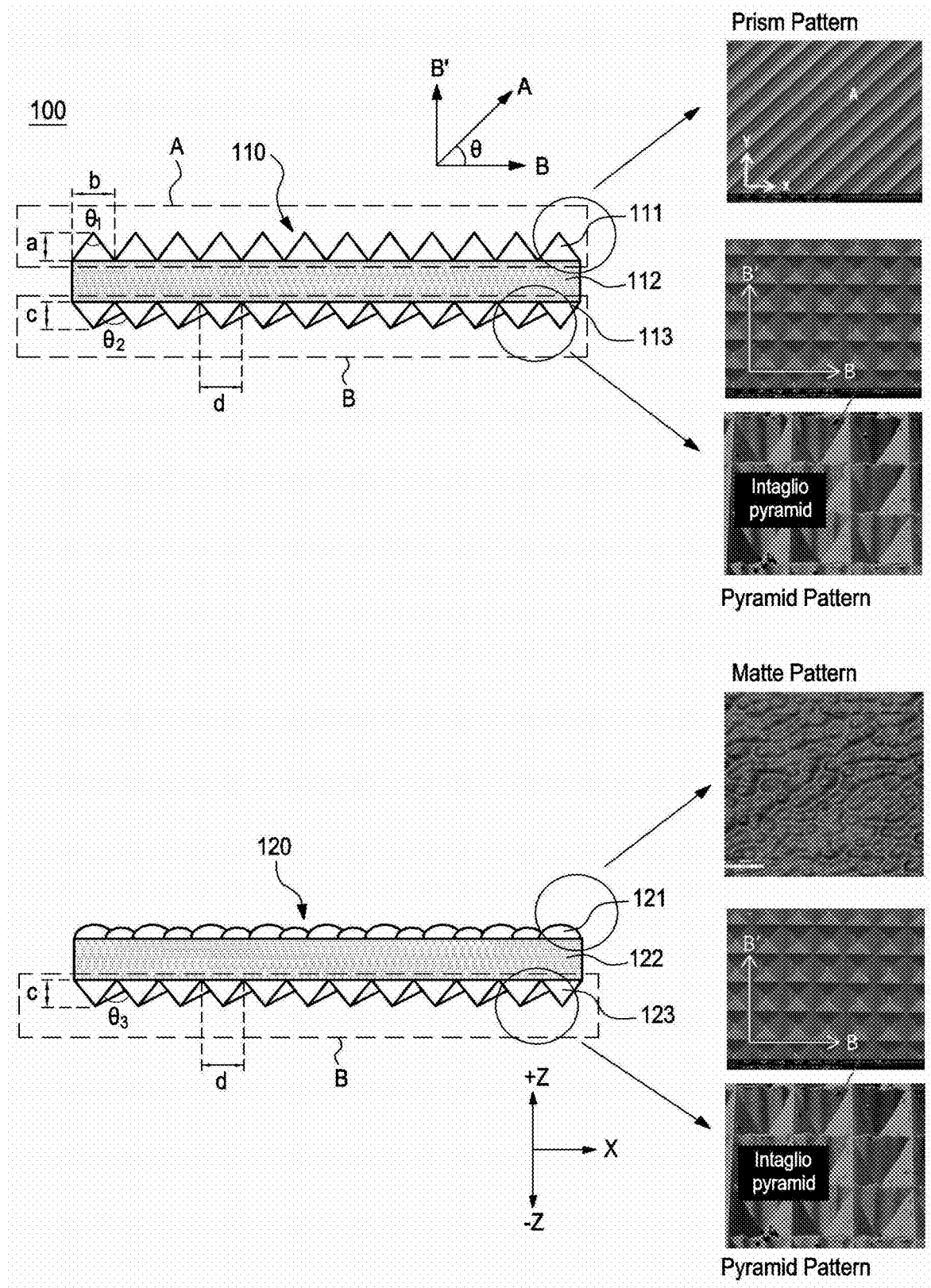
FIG. 5 is a schematic and images illustrating a plurality of sheets included in an optical film according to various embodiments of the present invention.

FIG. 5 is a schematic and images illustrating a plurality of sheets included in an optical film according to various embodiments of the present invention. In the present specification, a backlight unit (e.g., backlight unit 10 of FIGS. 1 and 2) may include a first optical film 100. The first optical film 100 may include a first sheet 110 and a second sheet 120 laminated with the first sheet 110. The configuration of the first sheet 110 and the second sheet 120 of FIG. 5 may be partially or entirely the same as the configuration of the first sheet 110 and the second sheet 120 of FIGS. 3 and 4.

Practically, the first sheet 110 and the second sheet 120 are laminated together to form one film. For the convenience of explanation, the first sheet 110 and the second sheet 120 are separately shown in FIG. 5.

According to various embodiments, the first sheet 110 may include a first base portion 112, a first pattern layer 111 including a first pattern disposed on one surface of the first base portion 112, and a second pattern layer 113 including a second pattern disposed on the other surface of the base portion 112. The first pattern layer 111 may be disposed on a surface of the first base portion 112 facing the +Z-direction and the second pattern layer 113 may be disposed on a surface of the first base portion 112 facing the −Z-direction.

According to one embodiment, the first base portion 112 may be configured to support the first pattern layer 111 and/or the second pattern layer 113. For example, the first base portion 112 is made of transparent material capable of transmitting light. For example, it may include material such as a polycarbonate series, a polysulfone series, a polyacrylate series, a polystyrene series, a poly vinyl chloride series, a polyvinyl alcohol series, a polynorbornene series, and a polyester series. For a specific example, the base portion 112 may be made of at least one of polyethylene terephthalate or polyethylene naphthalate.

According to various embodiments, the first pattern layer 111 may include a plurality of prism patterns having a parallel pattern direction toward a first direction (e.g., A-direction). A cross-section of each of the plurality of prism patterns may be triangular. Each of the plurality of prism patterns may be designed to have a size that gradually decreases toward the +Z-direction.

According to various embodiments, the second pattern layer 113 may include a plurality of pyramid patterns having a plurality of rows in a second direction (e.g., B-direction) and a plurality of columns in a third direction perpendicular to the second direction (e.g., B'-direction). A cross-section of each of the plurality of pyramid patterns may have a triangular or trapezoidal shape. The plurality of pyramid patterns may be designed as intaglio patterns when they are viewed from below the second pattern layer 113 (viewed toward the +Z-direction). According to one embodiment, the second direction (e.g., B-direction) may face a different direction from the first direction (e.g., A-direction). According to one embodiment, the angle φ formed between the second direction (e.g., B-direction) and the first direction (e.g., A-direction) may be configured to have approximately 45° (e.g., 40° to 50°). The brightness performance may be improved by setting the second direction (e.g., B-direction) to form an angle of approximately 45° with the first direction (e.g., A-direction) and setting a direction of the fourth pattern layer 123 disclosed below to be the same as the direction of the second pattern layer 113. Each of the plurality of pyramid patterns is formed in an intaglio shape and may be designed to have a size that gradually increases toward the −Z-direction.

According to one embodiment, the thickness of the first base portion 112 may be approximately 100 µm. However, the thickness of the first base film 112 is not limited to the above example and may be designed in various ways to be suitable for supporting the first pattern layer 111 and the second pattern layer 113.

The first sheet 110 according to the present invention may be provided to increase the effect of reducing light interference and color non-uniformity along with the light diffusion effect by disposing the pattern layers (a first pattern layer 111 and a second pattern layer 113) on one surface and the other surface, in other words, on both surfaces, of the first base portion 112. According to one embodiment, micro-patterning of the first pattern layer 111 and the second pattern layer 113 may be implemented by depositing UV (ultraviolet) curable resin solution to one surface (or the other side) of the base portion 112 and irradiating light.

According to various embodiments, as to the light diffusion effect, light incident to the second pattern layer 113 may be diffused through a plurality of pyramid patterns formed on the second pattern layer 113. The second pattern layer 113 may transmit light to the direction (+Z-direction) of light emitted from the light source 11a. In this process, loss of light can be minimized by refracted light refracted on the interface of the pyramid pattern and reflected light caused by interface reflection. In addition, reduction in brightness can be minimized. The pyramid patterns formed on the second pattern layer 113 may include a plurality of pyramids (e.g., M×N pyramids). A pyramid pattern with M rows and N columns may be formed to at least partially overlap the light source 11a formed on the substrate 11.

According to various embodiments, the first sheet 110 may include the first pattern layer 111 where the prism pattern with a predetermined height (or thickness) (a) and a pitch distance (b) is formed. In addition, the second pattern layer 113 where the pyramid pattern with a predetermined height (or thickness) (c) and a pitch distance (d) is formed.

According to one embodiment, the backlight unit may improve brightness by controlling the vertex angle of the first pattern layer 111 and the second pattern layer 113 of the first sheet 110. In general, for the lower pattern layer where the pyramid pattern is formed, light may be refracted in a condensed way when the vertex angle is approximately 130° and light may be refracted in a dispersed way when the vertex angle is approximately 90°. In addition, for the upper pattern layer where the prism pattern is formed, retroreflection may be active as light recycling occurs more when the vertex angle is approximately 90°. According to one embodiment, the vertex angle of the pyramid pattern of the second pattern layer 113 may be set to be approximately 90° and the vertex angle of the prism pattern of the first pattern layer 111 may be set to be approximately 90°. As for an optical path provided to the first sheet 110, light may be incident to the second pattern layer 113 and then be emitted through the first base portion 112 and the first pattern layer 111. Accordingly, the incident light provided to the first sheet 110 may provide condense light refracted in a dispersed way by the pyramid pattern of the second pattern layer 113, undergo active retroreflection caused by recycling, and then provide emitted light in a way to be condensed at the center by the prism pattern of the first pattern layer 113.

According to one embodiment, the height (a) and the pitch distance (b) of the prism pattern may be defined based on the first vertex angle (θ1) for the first pattern layer 111. Here, the first vertex angle (θ1) may be defined as the angle between two opposing surfaces among the three surfaces forming a prism pattern with a triangular cross-section. For example, the first vertex angle (θ1) may be defined within 70° to 120°. And the height (a) and the pitch distance (b) of the prism pattern with a triangular cross-section may be defined according to a ratio based on the first vertex angle (θ1). For example, when the first vertex angle (θ1) for the first pattern layer 111 is less than 90° (e.g., 70° to 90°), the ratio of the height (a) to the pitch distance (b) for the prism pattern can be defined as approximately 1:1.4 to 1:2. For example, the height (a) of the prism pattern may be approximately 20 μm to approximately 40 μm and the pitch distance (b) of the prism pattern may be approximately 28 μm to 80 μm. For another example, the height (a) of the prism pattern may be approximately 20 μm to approximately 40 μm and the pitch distance (b) of the prism pattern may be approximately 40 μm to 60 μm. More specifically, it may be desirable for the height (a) of the prism pattern to be approximately 30 μm and the pitch distance (b) of the prism pattern to be approximately 50 μm. The first sheet 110 with improved brightness can be provided by the ratio of the height (a) and pitch distance (b) of the prism pattern.

According to another embodiment, the height (c) and pitch distance (d) of the pyramid pattern may be defined based on the second vertex angle (θ2) for the second pattern layer 113. Here, the second vertex angle (θ2) may be defined as the angle between two opposing surfaces among the four surfaces forming a pyramid pattern with a trapezoidal cross-section. For example, the second vertex angle (θ2) may be defined within a range of 90° to 150°. Within a specified range, as the vertex angle of the pyramid pattern is increased, the diffusivity of light incident on the first sheet 110 may further be decreased. If the vertex angle is decreased, the diffusivity of light may be increased, and brightness loss may be increased. And the height (c) and pitch distance (d) of the pyramid pattern with a trapezoidal cross-section may be defined according to a ratio based on the second vertex angle (θ2). For example, when the first vertex angle in the first pattern layer 111 is fixed at 90° and the second vertex angle is 90°, the ratio of the height (c) to the pitch distance (d) of the pyramid pattern can be defined as 1:2. For example, the height (c) of the pyramid pattern may be about 40 μm to about 60 μm, and the pitch distance (d) of the pyramid pattern may be about 80 μm to 120 μm. More specifically, it may be desirable that the height (c) of the pyramid pattern is approximately 50 μm, and the pitch distance (d) of the pyramid pattern is approximately 100 μm. A plurality of pyramid patterns having such heights (c) and pitch distances (d) may be regularly arranged in the lower part of the shielding sheet 110. The first sheet 110 with improved brightness can be provided by the ratio of the height (c) to pitch distance (d) of the pyramid pattern.

Because a plurality of pyramid patterns corresponds 1:1 with a light source (e.g., light source 11a in FIG. 2) formed on a substrate (e.g., substrate 11 in FIG. 2) or is arranged in a way where the pyramid patterns at least partially overlap to the light source, a point light source emitted from the light source is diffused as the surface light source. In addition, because the light from the light source 11a is separated (or diffused) by the diffusion action of the optical film 100, hot spot visibility (HSV) due to the concentration of light can be reduced.

According to various embodiments, the second sheet 120 may include a second base portion 122, a third pattern layer 121 including a third pattern disposed on one surface of the second base portion 122, and a fourth pattern layer 123 including a fourth pattern disposed on the other surface of the base portion 122. The third pattern layer 121 may be disposed on the surface of the second base portion 122 facing the +Z-direction and a fourth pattern layer 123 may be disposed on the surface of the second base portion 122 facing the −Z-direction.

According to one embodiment, the second base portion 122 may be configured to support the third pattern layer 121 and/or the fourth pattern layer 123. The thickness of the second base portion 122 may be approximately 100 μm. However, the thickness of the second base film 122 is not limited to the above example and may be designed in various ways to be suitable for supporting the third pattern layer 121 and the fourth pattern layer 123. The second base portion 122 is made of transparent material capable of transmitting light. For example, it may include material such as a polycarbonate series, a polysulfone series, a polyacrylate series, a polystyrene series, a poly vinyl chloride series, a polyvinyl alcohol series, a polynorbornene series, and a polyester series. For a specific example, the base portion 112 may be made of at least one of polyethylene terephthalate or polyethylene naphthalate.

According to various embodiments, the third pattern layer 121 may be formed as a matte pattern. For example, the third pattern layer 121 may have a plurality of protrusion portions (e.g., protrusions) arranged irregularly. Each of the plurality of protrusion portions may be randomly formed and may protrude toward the +Z-direction.

According to one embodiment, the plurality of protrusion portions of the third pattern layer 121 may not have a direction unlike the first pattern layer 111, the second pattern layer 113, and the fourth pattern layer 123. At least some of the plurality of protrusion portions of the third pattern layer 121 may have a curved shape. An adhesive layer is deposited to the upper surface of the plurality of protrusion portions of the third pattern layer 121. And then, as it is adhered to the second pattern layer 113 of the first sheet 110, the second sheet 120 and the first sheet 110 can be laminated to provide as a composite structure.

According to various embodiments, the fourth pattern layer 123 may include a plurality of pyramid patterns having rows in a second direction (e.g., B-direction) and having columns in a third direction perpendicular to the second direction (e.g., B'-direction). The fourth pattern layer 123 may be manufactured into a shape corresponding to the second pattern layer 113.

According to one embodiment, a cross-section of each of the plurality of pyramid patterns of the fourth pattern layer 123 may have a triangular or trapezoidal shape. The plurality of pyramid patterns may be designed as intaglio patterns when viewed from below the fourth pattern layer 123 (viewed toward the +Z-direction). According to one embodiment, the second direction (e.g., B-direction) may face a different direction from the first direction (e.g., A-direction). According to one embodiment, the angle $\phi$ formed between the second direction (e.g., B-direction) and the first direction (e.g., A-direction) may be formed to have an angle of approximately 45° (e.g., 40° to 50°). The brightness performance can be improved as the second direction (e.g., B-direction) is configured to have an angle of approximately 45° with the first direction (e.g., A-direction) and the directions of the second pattern layer 113 and the fourth pattern layer 123 disclosed above is configured to be the same. Each of the plurality of pyramid patterns may be formed in an intaglio shape and may be designed to have a size that gradually increases toward the −Z-direction.

According to one embodiment, the height and the pitch distance of the pyramid pattern of the fourth pattern layer 123 may be applied to the configuration of the second pattern layer 113. For example, the height and the pitch distance of the pyramid pattern of the fourth pattern layer 123 may be defined based on the third vertex angle ($\theta 3$).

Figure 6A:
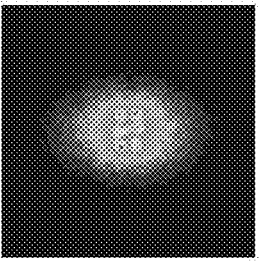
FIG. 6A is a table showing brightness, beam width, and brightness values with respect to the vertex angle of each prism according to various embodiments of the present invention.
Figure 6A:
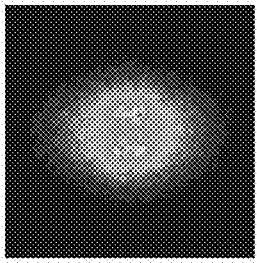
Figure 6A:
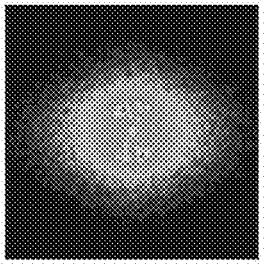
Figure 6A:
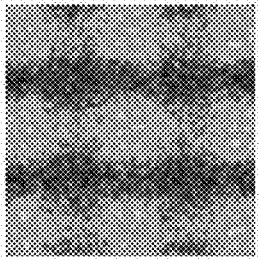
Figure 6A:
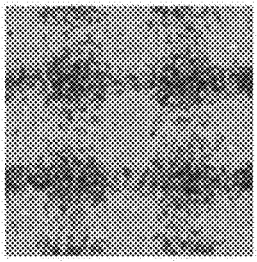
Figure 6A:
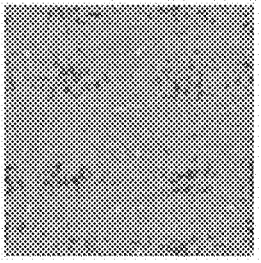
Figure 6A:
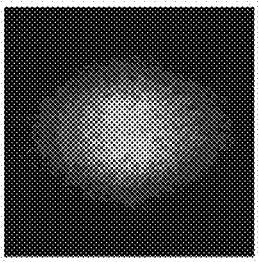
Figure 6A:
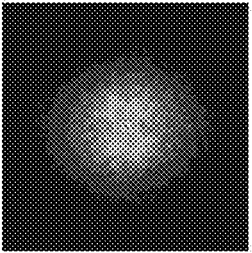
Figure 6A:
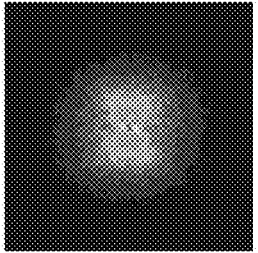
Figure 6A:
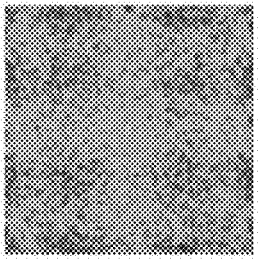
Figure 6A:
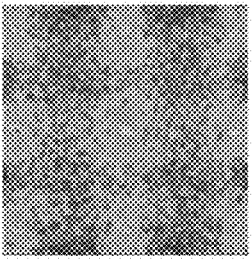
Figure 6A:
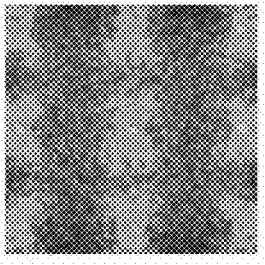
Figure 6B:
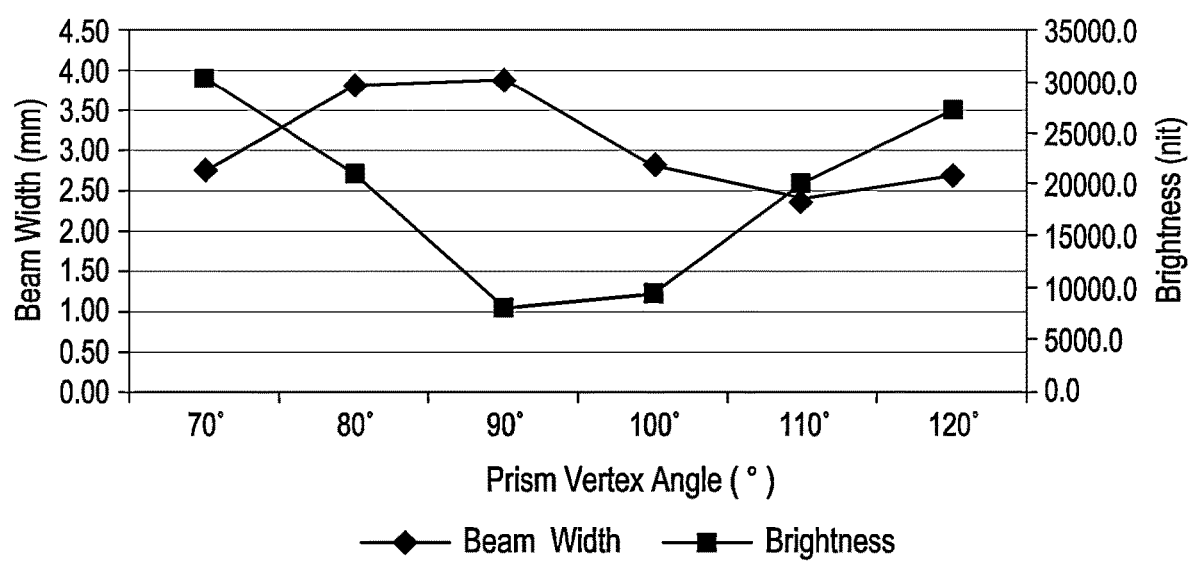
FIG. 6B is a graph showing beam width and brightness values with respect to the vertex angle of each prism according to various embodiments of the present invention.

FIG. 6A is a table showing brightness, beam width, and brightness values with respect to the vertex angle of each prism according to various embodiments of the present invention. FIG. 6B is a graph showing beam width and brightness values with respect to the vertex angle of each prism according to various embodiments of the present invention.

Referring to FIGS. 6A and 6B, in a case where the second vertex angle ($\theta 2$) of the pyramid pattern of the second pattern layer (e.g., the second pattern layer 113 in FIG. 5) is fixed while the first vertex angle ($\theta 1$) of the prism pattern of the first pattern layer (e.g., the first pattern layer 111 in FIG. 5) is varied, the brightness, beam width, and the brightness values can be confirmed. In the drawings according to various embodiments of the present invention including FIGS. 6A and 6B, the beam width may mean the area where the light passing through the shielding-sheet is dispersed based on the light source (LED). If the beam width is larger, hot spot visibility (HSV) due to the concentration of light is improved because of the light separation (or light diffusion). As a result, optical characteristics are shown to be excellent. In the drawings according to various embodiments of the present invention including FIGS. 6A and 6B, the brightness is a measurement of brightness of light radiated from a light source and indicates how bright the light source appears to an observer when viewed from a specific direction. And the unit is nit. As the nit value is increased, the brightness is increased, and optical characteristics are improved.

According to various embodiments, the beam width and the brightness values were measured when the second vertex angle ($\theta 2$) of the pyramid pattern of the second pattern layer 113 was fixed at approximately 130° while the first vertex angle ($\theta 1$) of the prism pattern of the first pattern layer 111 was varied from approximately 70° to 120°.

Referring to FIGS. 6A and 6B together, when the first vertex angle ($\theta 1$) of the prism pattern is 70°, the beam width is 2.77 mm, when it is 80°, the beam width is 3.85 mm, when it is 90°, the beam width is 3.92 mm, when it is 100°, the beam width is 2.83 mm, when it is 110°, the beam width is 2.41 mm, and when it is 120°, the beam width is 2.71 mm. It can be confirmed that the beam width reaches its maximum value at 90°.

Meanwhile, when the first vertex angle ($\theta 1$) of the prism pattern is 70°, the brightness value is 30,773.0, when it is 80°, the brightness value is 21,179.7, when it is 90°, the brightness value is 8,219.3, when it is 100°, the brightness value is 9,397.3, when it is 110°, the brightness value is 20,204.3, and when it is 120°, the brightness value is 27,346.4. The brightness value reaches its minimum value when the first vertex angle ($\theta 1$) of the prism pattern is approximately 90° and it can be confirmed that the brightness performance is improved as the vertex angle becomes smaller or larger than 90°.

Referring to FIGS. 6A and 6B, it can be confirmed that the optical film has excellent optical performance from a shielding perspective when the vertex angle of the pyramid pattern is fixed at 130° and the vertex angle of the prism pattern is 80° to 90°. According to various embodiments of the present invention, the vertex angle of a desirable prism pattern can be set with respect to the intersection of a line for the beam width and a line for the brightness value.

Figure 7A:
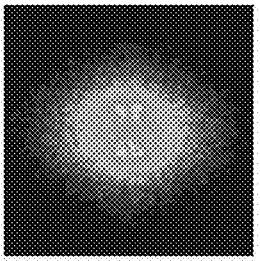
FIG. 7A is a table showing brightness, beam width, and brightness values with respect to the vertex angle of each prism according to various embodiments of the present invention.
Figure 7A:
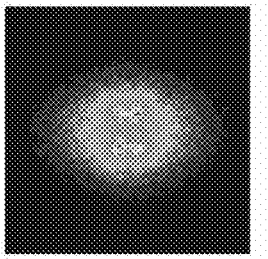
Figure 7A:
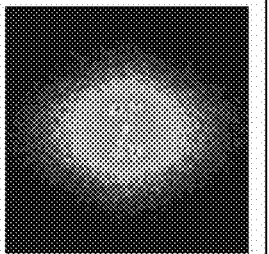
Figure 7A:
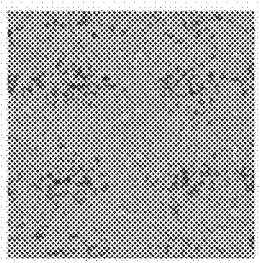
Figure 7A:
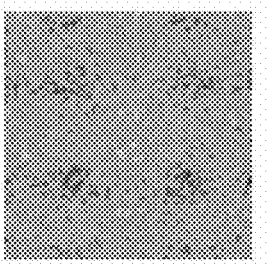
Figure 7A:
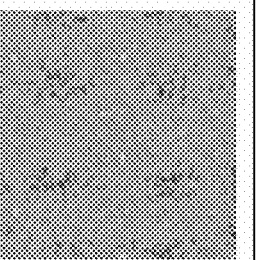
Figure 7A:
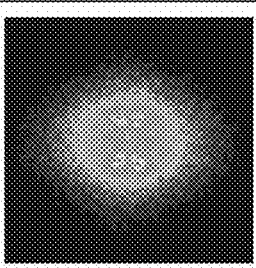
Figure 7A:
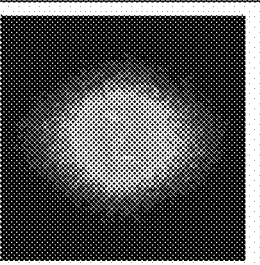
Figure 7A:
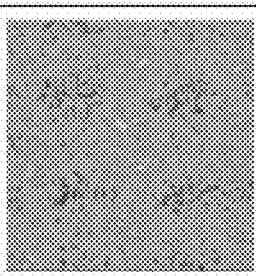
Figure 7A:
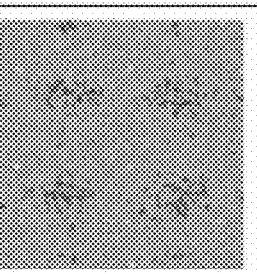
Figure 7B:
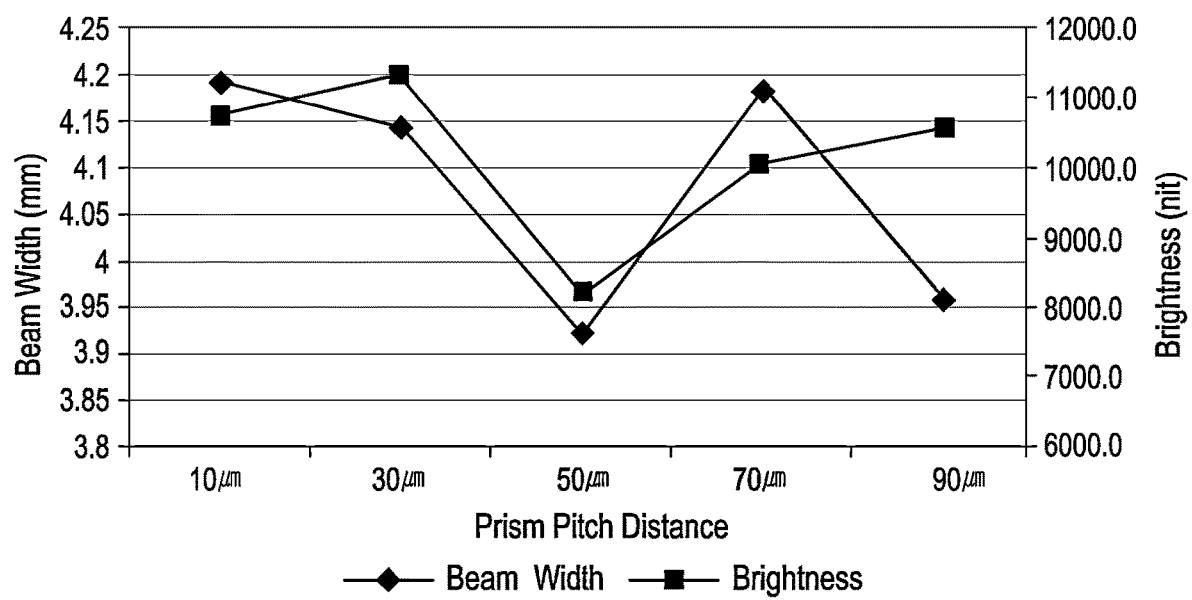
FIG. 7B is a graph showing beam width and brightness values with respect to the pitch distance of each prism according to various embodiments of the present invention.

FIG. 7A is a table showing brightness, beam width, and brightness values with respect to the vertex angle of each prism according to various embodiments of the present invention. FIG. 7B is a graph showing beam width and brightness values with respect to the pitch distance of each prism according to various embodiments of the present invention.

Referring to FIGS. 7A and 7B, in a case where the second vertex angle ($\theta 2$) of the pyramid pattern of the second pattern layer (e.g., the second pattern layer 113 in FIG. 5) is fixed while the first vertex angle ($\theta 1$) of the prism pattern of the first pattern layer (e.g., the first pattern layer 111 in FIG. 5) is fixed, the brightness, beam width, and the brightness values can be confirmed.

According to various embodiments, the beam width and the brightness values were measured when the second vertex angle ($\theta 2$) of the pyramid pattern of the second pattern layer 113 was fixed at approximately 130° and the first vertex angle ($\theta 1$) of the prism pattern of the first pattern layer 111 was fixed at approximately 90° while the pitch distance of the prism pattern was varied from 10 μm to 90 μm.

Referring to FIGS. 7A and 7B together, when the pitch distance of the prism pattern is 10 μm, the beam width is 4.19 mm, when the pitch distance is 30 μm, the beam width is 4.14 mm, when the pitch distance is 50 μm, the beam width is 3.92 mm, when the pitch distance is 70 μm, the beam width is 4.18 mm, and when the pitch distance is 90 μm, the beam width is 3.96 mm. It can be confirmed that the minimum beam width is when the pitch distance is 50 μm.

Meanwhile, it can be confirmed that when the pitch distance of the prism pattern is 10 μm, the brightness value is 10,772.7, when the pitch distance is 30 μm, the brightness value is 11,353.6, when the pitch distance is 50 μm, the brightness value is 8,219.3, and when the pitch distance is 70 μm, the brightness value is 10,078.7, and when the pitch distance is 90 μm, the brightness value is 10,565.2. The brightness value shows the minimum value when the pitch distance of the prism pattern is approximately 50 μm and it can be confirmed that the brightness performance improves as the pitch distance becomes smaller or larger than approximately 50 μm. It can be confirmed that the maximum brightness value is shown when the pitch distance of the prism pattern is 30 μm.

Referring to FIGS. 7A and 7B, it can be confirmed that the optical film has excellent optical performance from the perspective of shielding performance and the brightness value if the pitch distance of the prism pattern is smaller when the vertex angle of the pyramid pattern is fixed at 130° and the vertex angle of the prism pattern is fixed at 90°. According to various embodiments of the present invention, the pitch distance of a desirable prism pattern can be set with respect to the intersection of a line for the beam width and a line for the brightness value. Referring to FIG. 7B, the prism pattern may be preferably formed to have a pitch distance of 10 μm to 30 μm according to various embodiments of the present invention.

Figure 8A:
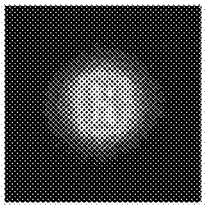
FIG. 8A is a table showing brightness, beam width, and brightness values with respect to the vertex angle of each pyramid according to various embodiments of the present invention.
Figure 8A:
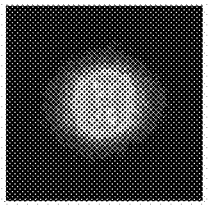
Figure 8A:
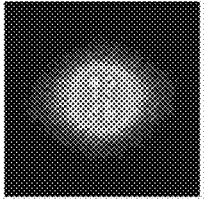
Figure 8A:
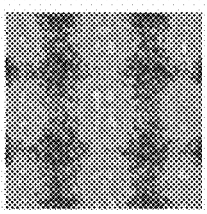
Figure 8A:
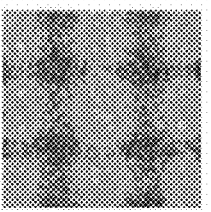
Figure 8A:
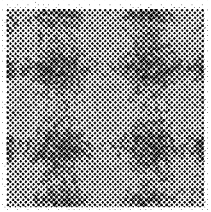
Figure 8A:
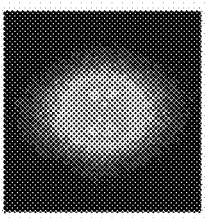
Figure 8A:
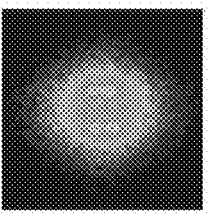
Figure 8A:
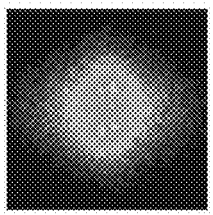
Figure 8A:
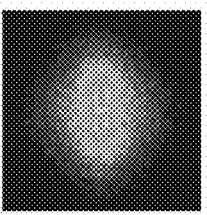
Figure 8A:
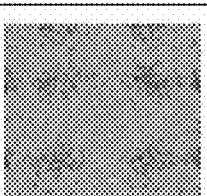
Figure 8A:
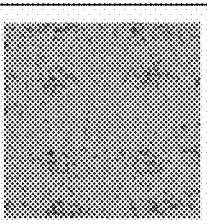
Figure 8A:
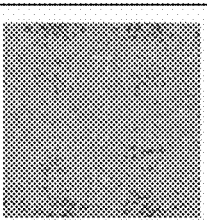
Figure 8A:
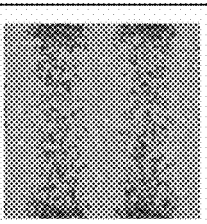
Figure 8B:
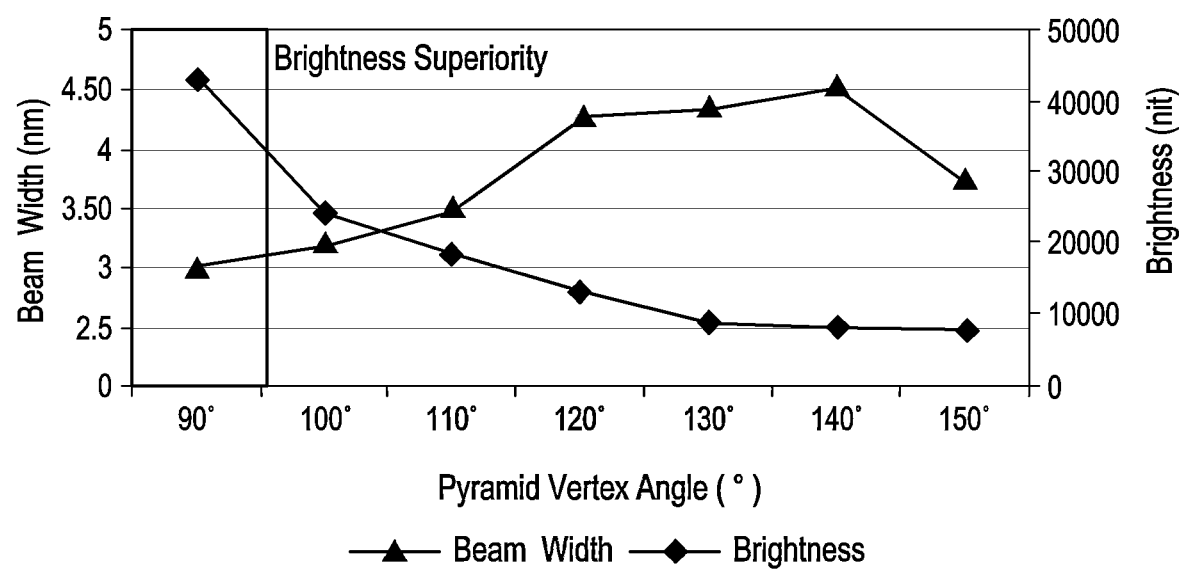
FIG. 8B is a graph showing beam width and brightness values with respect to the vertex angle of each pyramid according to various embodiments of the present invention.

FIG. 8A is a table showing brightness, beam width, and brightness values with respect to the vertex angle of each pyramid according to various embodiments of the present invention. FIG. 8B is a graph showing beam width and brightness values with respect to the vertex angle of each pyramid according to various embodiments of the present invention.

Referring to FIGS. 8A and 8B, in a case where the first vertex angle (θ1) of the prism pattern of the first pattern layer (e.g., the first pattern layer 111 in FIG. 5) is fixed while the second vertex angle (θ2) of the pyramid pattern of the second pattern layer (e.g., the second pattern layer 113 in FIG. 5) is varied, the brightness, beam width, and brightness values can be confirmed.

According to various embodiments, the beam width and the brightness values were measured when the first vertex angle (θ1) of the prism pattern of the first pattern layer 111 was fixed at approximately 90° while the second vertex angle (θ2) of the pyramid pattern of the second pattern layer 113 was varied from approximately 90° to 130°.

Referring to FIGS. 8A and 8B together, when the second vertex angle (θ2) of the pyramid pattern is 90°, the beam width is 3.00 mm, when it is 100°, the beam width is 3.17 mm, when it is 110°, the beam width is 3.48 mm, when it is 120°, the beam width is 4.25 mm, when it is 130°, the beam width is 4.33 mm, when it is 140°, the beam width is 4.50 mm, and when it is 150°, the beam width is 3.75 mm. It can be confirmed that the beam width reaches its maximum value at 140°.

Meanwhile, when the second vertex angle (θ2) of the pyramid pattern is 90°, the brightness value is 43,472.7, when it is 100°, the brightness value is 24,430.2, when it is 110°, the brightness value is 18,246.4, and when it is 120°, the brightness value is 13,252.0, when it is 130°, the brightness value is 8,852.5, when it is 140°, the brightness value is 8,093.3, and when it is 150°, the brightness value is 7,858.4. The brightness value reaches its maximum value when the second vertex angle (θ2) of the pyramid pattern is approximately 90° and it can be confirmed that the brightness performance is deteriorated as the vertex angle is increased with respect to approximately 90°.

Referring to FIGS. 8A and 8B, it can be confirmed that the beam width and brightness values tend to be inversely proportional to each other in most ranges. For example, when the vertex angle of the prism pattern is fixed at 90° and the vertex angle of the pyramid pattern is 90° (e.g., approximately 85° to 95°), excellent optical performance is shown from the brightness perspective. When the vertex angle of the prism pattern is fixed at 90° and the vertex angle of the pyramid pattern is 140° (for example, approximately 130° to 145°), excellent optical performance can be shown from the beam width perspective. According to various embodiments of the present invention, the vertex angle of a desirable pyramid pattern can be set with respect to the intersection of a line for the beam width and a line for the brightness value. Accordingly, referring to FIG. 8B, it can be designed to have the vertex angle of the pyramid pattern being at approximately 90° (e.g., 85° to 95°) while the vertex angle of the prism pattern is fixed at approximately 90° to ensure excellent brightness performance.

Figure 9B:
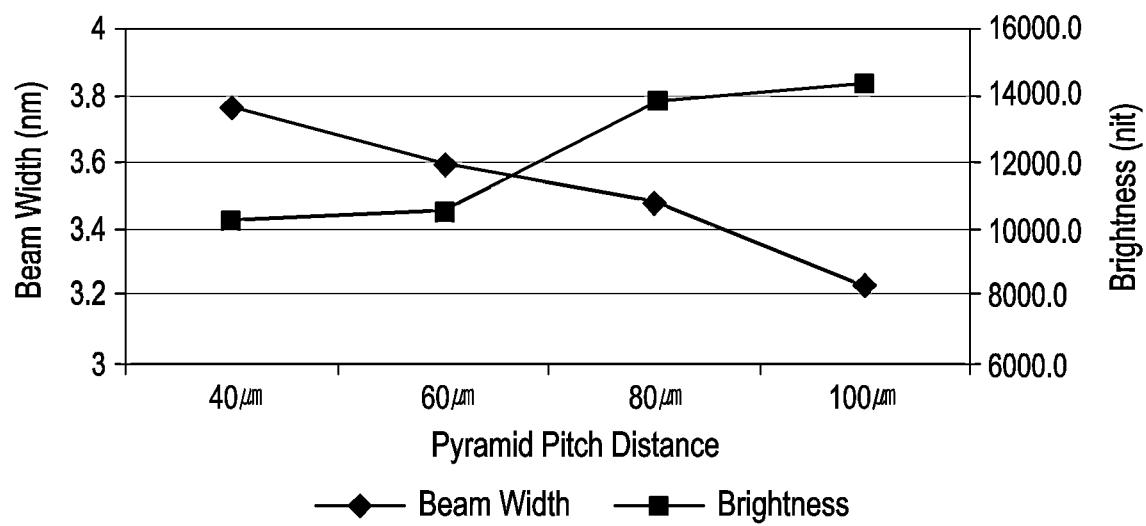
FIG. 9B is a graph showing beam width and brightness values with respect to the pitch distance of each pyramid according to various embodiments of the present invention.

FIG. 9A is a table showing brightness, beam width, and brightness values with respect to the pitch distance of each pyramid according to various embodiments of the present invention. FIG. 9B is a graph showing beam width and brightness values with respect to the pitch distance of each pyramid according to various embodiments of the present invention. Referring to FIGS. 8A and 8B, in a case where the second vertex angle (θ2) of the pyramid pattern of the second pattern layer (e.g., the second pattern layer 113 in FIG. 5) and the first vertex angle (θ1) of the prism pattern of the first pattern layer (e.g., the first pattern layer 111 in FIG. 5) are fixed, the brightness, beam width, and brightness values can be confirmed.

According to various embodiments, the beam width and the brightness values were measured when the second vertex angle (θ2) of the pyramid pattern of the second pattern layer 113 was fixed at approximately 130° and the first vertex angle (θ1) of the prism pattern of the first pattern layer 111 was fixed at approximately 90° while the pitch distance of the prism pattern was varied from 40 μm to 90 μm. Referring to FIGS. 9A and 9B together, when the pitch distance of the prism pattern is 40 μm, the beam width is 3.77 mm, when the pitch distance is 60 μm, the beam width is 3.60 mm, when the pitch distance is 80 μm, the beam width is 3.49 mm, and when the pitch distance is 100 μm, the beam width is 3.23 mm. It can be confirmed that the beam width performance may be deteriorated as the pitch distance of the pyramid pattern becomes wider.

Meanwhile, it can be confirmed when the pitch distance of the pyramid pattern is 40 μm, the brightness value is 10,282.0, when the pitch distance is 60 μm, the brightness value is 10,627.2, when the pitch distance is 80 μm, the brightness value is 13,909.8, and when the pitch distance is 100 μm, the brightness value is 14,405.2. It can be confirmed that the pitch distance reaches a maximum value around 100 μm as the pitch distance of the pyramid pattern is gradually increased.

Referring to FIGS. 9A and 9B, it can be confirmed that the beam width and brightness values tend to be inversely proportional to each other in most ranges. For example, with the vertex angle of the pyramid pattern being fixed at 130° and the vertex angle of the prism pattern being fixed at 90°, it can be confirmed that the optical film has excellent optical performance from the beam width perspective as the pitch distance of the pyramid pattern becomes smaller. With the vertex angle of the pyramid pattern being fixed at 130° and the vertex angle of the prism pattern being fixed at 90°, it can be confirmed that the optical film has excellent optical performance from the brightness perspective as the pitch distance of the pyramid pattern becomes larger (for example, the pitch distance is 80 μm to 100 μm). According to various embodiments of the present invention, the pitch distance of a desirable pyramid pattern can be set with respect to the intersection of a line for the beam width and a line for the brightness value. Referring to FIG. 9B, the pyramid pattern can be designed to have a pitch distance of approximately 100 μm (e.g., 80 μm to 120 μm) to ensure excellent brightness performance.

The optical film of various embodiments of the present invention described above and the backlight unit including the optical film are not limited to the above-described embodiments and drawings. Moreover, various substitutions, modifications, and changes are possible for those skilled in the art within the technical scope of the present invention. The effects that can be obtained from the present invention are not limited to the effects mentioned above, and other effects not mentioned can be clearly understood by those skilled in the art from the description above.

What is claimed is:

1. An optical film comprising:
a first sheet including a first base portion; a first pattern layer including a plurality of first prisms wherein each first prism has a first vertex angle and a first height, the first prisms are arranged parallel along a first direction with a first pitch distance between the first prisms and are formed on a first surface of the first base portion; and a second pattern layer including a plurality of first intaglio pyramids wherein each first intaglio pyramid has a second vertex angle and a second height, the first intaglio pyramids are arranged parallel along a second direction as a row direction of the first intaglio pyramids and a third direction as a column direction of the first intaglio pyramids with a second pitch distance between the first intaglio pyramids and are formed as intaglio on a second surface of the first base portion; and
a second sheet including a second base portion; a third pattern layer wherein a plurality of protrusions with an adhesive property is arranged randomly and is formed as a matte pattern on a third surface of the second base portion; and a fourth pattern layer including a plurality of second intaglio pyramids arranged parallel along a fourth direction as a row direction of the second intaglio pyramids and a fifth direction as a column direction of the second intaglio pyramids and formed as intaglio on a fourth surface of the second base portion,
wherein the first direction and the second direction form an angle in a range of 40° to 50°; the second direction and the fourth direction are substantially the same direction; the third direction and the fifth direction are substantially the same direction; and the first sheet and the second sheet are laminated through the third pattern layer.

2. The optical film of claim 1, wherein a refractive index of the first pattern layer and a refractive index of the fourth pattern are substantially the same and the refractive index of the first pattern layer and the refractive index of the fourth pattern are in a range of 1.50 to 1.70.

3. The optical film of claim 1, wherein the first vertex angle is in a range of 70° to 90°.

4. The optical film of claim 1, wherein a ratio of the first height to the first pitch distance is in a range of approximately 1:1.4 to 1:2 upon the first vertex angle is less than 90°.

5. The optical film of claim 1, wherein the first height is in a range of 20 μm to 40 μm and the first pitch distance is in a range of 40 μm to 60 μm upon the first vertex angle is less than 90°.

6. The optical film of claim 1, wherein the second vertex angle is in a range of 90° to 150°.

7. The optical film of claim 1, wherein the second vertex angle is in a range of 85° to 95° upon fixing the first vertex angle of 90°.

8. The optical film of claim 1, wherein a ratio of the second height to the second pitch distance is approximately 1:2 upon the first vertex angle is less than 90°.

9. The optical film of claim 1, wherein the second height is in a range of 40 μm to 60 μm and the second pitch distance is in a range of 80 μm to 120 μm upon fixing the first vertex angle of 90° and the second vertex of 90°.

10. The optical film of claim 1, wherein a thickness of the second base portion is thicker than a thickness of the first base portion.

11. The optical film of claim 1, wherein a cross-section of the first intaglio pyramid is a trapezoidal shape.

12. A backlight unit comprising:
a light source;
a color conversion sheet disposed on the light source;
a first optical film disposed on the color conversion sheet, the first optical film comprising:
a first sheet including a first base portion; a first pattern layer including a plurality of first prisms wherein each first prism has a first vertex angle and a first height, the first prisms are arranged parallel along a first direction with a first pitch distance between the first prisms and are formed on a first surface of the first base portion; and a second pattern layer including a plurality of first intaglio pyramids wherein each first intaglio pyramid has a second vertex angle and a second height, the first intaglio pyramids are arranged parallel along a second direction as a row direction of the first intaglio pyramids and a third direction as a column direction of the first intaglio pyramids with a second pitch distance between the first intaglio pyramids, and are formed as intaglio on a second surface of the first base portion; and
a second sheet including a second base portion; a third pattern layer where a plurality of protrusions with an adhesive property is arranged randomly and is formed as a matte pattern on a third surface of the second base portion; and a fourth pattern layer including a plurality of second intaglio pyramids arranged parallel along a fourth direction as a row direction of the second intaglio pyramids and a fifth direction as a column direction of the second intaglio pyramids and formed as intaglio on a fourth surface of the second base portion,
wherein the first direction and the second direction form an angle in a range of 40° to 50°, the second direction and the fourth direction are substantially the same direction, the third direction and the fifth direction are substantially the same direction, and the first sheet and the second sheet are laminated through the third pattern layer;
a second optical film disposed on the first optical film, the second optical film comprising:
a third sheet including a third base portion, and a fifth pattern layer including a plurality of second prisms where the second prisms are arranged parallel along a sixth direction and are formed on a fifth surface of the third base portion; and a fourth sheet including a fourth base portion, and a sixth pattern layer including a plurality of third prisms where the third prisms are arranged parallel along a seventh direction and are formed on a sixth surface of the fourth base portion, wherein the fourth sheet is disposed on the first sheet of the first optical film, the third sheet is disposed on the fourth sheet, and the sixth direction and the seventh direction form an angle in a range of 85° to 95°; and a diffusion sheet disposed on the third sheet of the second optical film.

13. The backlight unit of claim 12, wherein a refractive index of the third pattern layer and a refractive index of the fourth pattern are substantially the same and the refractive index of the third pattern layer and the refractive index of the fourth pattern are in a range of 1.50 to 1.70.

14. The backlight unit of claim 12, wherein the first vertex angle is in a range of 70° to 90°.

15. The backlight unit of claim 12, wherein the first height is in a range of 20 μm to 40 μm and the first pitch distance is in a range of 40 μm to 60 μm upon the first vertex angle is less than 90°.

16. The backlight unit of claim 12, wherein the second vertex angle is in a range of 85° to 95° upon fixing the first vertex angle of 90°.

17. The backlight unit of claim 12, wherein the second height is in a range of 40 μm to 60 μm and the second pitch distance is in a range of 80 μm to 120 μm upon fixing the first vertex angle of 90° and the second vertex of 90°.

18. The backlight unit of claim 12, wherein a thickness of the second base portion is thicker than a thickness of the first base portion.

19. The backlight unit of claim 12, wherein a cross-section of the first intaglio pyramid is a trapezoidal shape.

20. The backlight unit of claim 12, wherein the third sheet and the fourth sheet are laminated.

* * * * *